May 26, 1931.　　　F. W. HIGHFIELD　　　1,807,530
POWER METER

Filed July 16, 1928

F. W. Highfield
INVENTOR

By Marks & Clerk
ATYS.

Patented May 26, 1931

1,807,530

UNITED STATES PATENT OFFICE

FRANK WOOTTON HIGHFIELD, OF COVENTRY, ENGLAND

POWER METER

Application filed July 16, 1928, Serial No. 292,976, and in Great Britain July 22, 1927.

This invention relates to power meters for use in conjunction with dynamo electric machines which are employed for the testing of internal combustion engines and other prime movers. Hitherto wattmeters have been connected to a dynamo which is driven by an engine, and the indications of the wattmeter have been used as a measure of the power developed by the engine. Difficulty has been experienced in obtaining accurate and convenient calibration of such instruments, owing to the variable efficiencies of the machines from which the voltage and current coils of the instruments are supplied.

The object of the present invention is to enable this disadvantage to be overcome in a simple and convenient manner.

The invention comprises the supplying of the voltage coil or an additional compensating coil from a separate small dynamo electric machine in which the electro-motive force is proportional to the speed of rotation, the ordinary current coil of the wattmeter being supplied from the machine which is driven by the engine or other prime mover under test.

The invention also comprises the use, in some circumstances, in parallel with the current coil, of a shunt having a positive temperature co-efficient, the resistance being suitably proportioned to provide a compensation which is correlated with the ohmic resistance losses in the dynamo.

In the accompanying drawings:—

Figure 1:
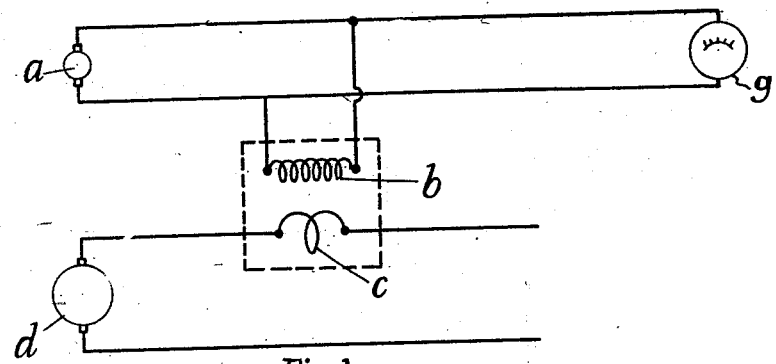
Figure 2:
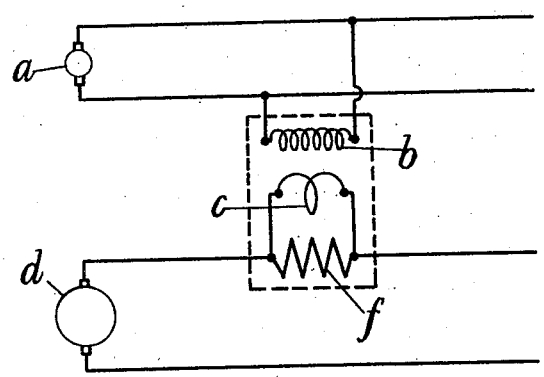

Figures 1 and 2 illustrate diagrammatically two different methods of carrying the invention into effect.

Referring to Figure 1, I make use of a small electric current generator $a$, which is sometimes employed for actuating a speed indicator $g$, the design of this machine being such that over a wide range the electro-motive force is strictly proportional to the speed of rotation. This generator is connected to the voltage coil $b$ of the wattmeter as well as to the speed indicator, the two instruments being in parallel. The current coil $c$ of the wattmeter is supplied with current from the dynamo $d$ connected to the engine being tested. The dotted rectangle around the coils $b$, $c$ merely indicate that the coils are associated in a wattmeter. It will be understood that the dynamo $a$ is mechanically connected to the dynamo $d$ or to the engine. By separately exciting the voltage coil in the above described manner, I find that I am able to improve the accuracy of wattmeters used for indicating the power developed by the prime mover connected to the dynamo.

When heavy currents are developed in the dynamo a source of error in the wattmeter readings is sometimes found owing to the ohmic resistance losses in the dynamo. I am able to compensate this error by the use as shown in Figure 2 in conjunction with the circuit of the current coil $c$ of the wattmeter of a suitably designed shunt $f$ having a positive temperature co-efficient.

As regards the resistance $f$ shown in Figure 2, this is required where the chief source of error is occasioned by ohmic losses in the dynamo $d$. Here again the total power generated by the machine is dissipated partly by discharge of current through the external circuit and partly by ohmic losses in the dynamo. In the ordinary way a wattmeter does not take account of ohmic losses and consequently the wattmeter reads low. To compensate this defect where it is necessary to make allowance for ohmic losses in the dynamo, the applicant uses a resistance $f$ having a positive temperature coefficient. When the current delivered by the dynamo $d$ increases, the resistance of the coil $f$ also increases and so diverts a greater amount of current through the coil $c$. By suitably adjusting the coil $f$, which is merely a matter of experiment, it becomes possible to correct the indication of the wattmeter in a manner which will automatically make allowance for ohmic losses.

By this invention I am not only able to obtain more accurate calibration, but I am also able to provide a more convenient scale on the indicating instrument.

Having thus described my invention what I claim as new and desire to secure by Letters Patent is:—

In an apparatus for testing the power developed by internal combustion engines and other prime movers, the combination comprising a wattmeter, a dynamo to be driven by the prime mover being tested, a circuit connected to said dynamo and including the current coil of the wattmeter, a small dynamo to be driven by said prime mover and so constructed that the electromotive force developed thereby will be proportional to the speed of rotation of its armature, and a circuit from said small dynamo including the voltage coil of the wattmeter.

In testimony whereof I have signed my name to this specification.

FRANK WOOTTON HIGHFIELD.